United States Patent
Gupta et al.

(10) Patent No.: US 10,318,330 B2
(45) Date of Patent: Jun. 11, 2019

(54) DATA-PERSISTING TEMPORARY VIRTUAL MACHINE ENVIRONMENTS

(71) Applicant: salesforce.com, inc., San Francisco, CA (US)

(72) Inventors: Varun Gupta, Berkeley, CA (US); Kimberly Lee, Sausalito, CA (US)

(73) Assignee: salesforce.com, inc., San Francisco, CA (US)

( * ) Notice: Subject to any disclaimer, the term of this patent is extended or adjusted under 35 U.S.C. 154(b) by 228 days.

(21) Appl. No.: 15/421,148

(22) Filed: Jan. 31, 2017

(65) Prior Publication Data
US 2018/0150312 A1 May 31, 2018

Related U.S. Application Data

(60) Provisional application No. 62/428,129, filed on Nov. 30, 2016.

(51) Int. Cl.
*G06F 9/455* (2018.01)
*G06F 12/08* (2016.01)
*G06F 11/14* (2006.01)

(52) U.S. Cl.
CPC ...... *G06F 9/45558* (2013.01); *G06F 11/1402* (2013.01); *G06F 12/08* (2013.01); *G06F 2009/45562* (2013.01); *G06F 2009/45575* (2013.01); *G06F 2009/45579* (2013.01)

(58) Field of Classification Search
CPC ............ G06F 9/45558; G06F 11/1402; G06F 2009/45562; G06F 2009/45575; G06F 2009/45579; G06F 12/08
See application file for complete search history.

(56) References Cited

U.S. PATENT DOCUMENTS

| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |

(Continued)

OTHER PUBLICATIONS

U.S. Appl. No. 13/986,251, filed Apr. 16, 2013.

*Primary Examiner* — Jacob D Dascomb
(74) *Attorney, Agent, or Firm* — Dergosits & Noah LLP; Todd A. Noah (57) ABSTRACT

Data-persisting temporary virtual machine environments are described. A computing system enables a user to access a virtual machine and a virtual data store in a temporary virtual machine environment in response to receiving a user request to access the temporary virtual machine environment. The computing system stores data as virtual data store data in the virtual data store in response to receiving the data from the user. The computing system creates a copy of the virtual data store data if all users are signed off from use of the temporary virtual machine environment. The computing system deletes the virtual machine and the virtual data store. The computing system receives a request by a specific user to access the temporary virtual machine environment, and enables the specific user to access a recreated virtual machine and the copy of the virtual data store data.

17 Claims, 3 Drawing Sheets

(56) References Cited

U.S. PATENT DOCUMENTS

| | | |
|---|---|---|
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven, et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0216975 A1* | 8/2009 | Halperin ............ G06F 9/45537 711/162 |
| 2012/0233137 A1 | 9/2012 | Jakobson et al. |
| 2013/0152079 A1* | 6/2013 | Heyman ............ G06F 9/45558 718/1 |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0127970 A1* | 5/2015 | Bivens ............ G06F 11/2007 714/4.11 |
| 2015/0172563 A1 | 6/2015 | Jakobson et al. |
| 2017/0075719 A1* | 3/2017 | Scallan ............ G06F 11/1464 |

* cited by examiner

DATA-PERSISTING TEMPORARY VIRTUAL MACHINE ENVIRONMENTS

PRIORITY CLAIM AND RELATED APPLICATIONS

This application claims priority under 35 U.S.C. § 119 or the Paris Convention from U.S. Provisional Patent Application 62/428,129, filed Nov. 30, 2016, the entire contents of which is incorporated herein by reference as if set forth in full herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

A virtual machine can be a software implementation of a computer that executes programs similar to a physical machine. A virtual machine environment can provide a complete system platform which supports the execution of a complete operating system on at least one virtual machine, and can emulate an existing architecture, including at least one virtual data store, which can be a software implementation of a storage repository, such as a virtual disk.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

After a virtual machine monitor creates a virtual machine environment for use on a temporary basis, a user of the temporary virtual machine environment may spend a significant amount of time creating gigabytes or terabytes of data in and/or moving gigabytes or terabytes of data to the user's virtual data store, which the virtual machine monitor subsequently deletes due to the temporary nature of the virtual machine environment. After the user later requests the virtual machine monitor to recreate the user's temporary virtual machine environment, and the virtual machine monitor creates the requested temporary virtual machine environment, the user may have to spend hours, or even days, recreating their gigabytes or terabytes of data before the user can execute any tests using their data.

In accordance with embodiments described herein, there are provided methods and systems for data-persisting temporary virtual machine environments. After receiving a user request to access a temporary virtual machine environment, a computing system enables a user to access both a virtual machine and a virtual data store that are in the temporary virtual machine environment. Upon receiving data from the user, the computing system stores the data as virtual data store data in the virtual data store. When all users are signed off from use of the temporary virtual machine environment, the computing system creates a copy of the virtual data store data, and deletes the virtual machine and the virtual data store. Following receipt of a specific user request to access the temporary virtual machine environment, the computing system enables a specific user to access the recreated virtual machine and the copy of the virtual data store data.

For example, a computing system's hypervisor receives a Monday morning request from the manager of a marketing application development team to access a temporary virtual machine environment, and creates a virtual application server and a virtual disk for the requested temporary virtual machine environment. The computing system receives marketing data from the manager over an 8 hour period on Monday, and stores the marketing data into the virtual disk on Monday. When all of the members of the marketing application development team have signed off from use of the temporary virtual machine environment that was testing a marketing application, the computing system creates a Monday night snapshot of the marketing data in the virtual disk, and creates an identifier that uniquely identifies the Monday night snapshot. The hypervisor deletes the virtual application server that was testing the marketing application and deletes its virtual disk. The hypervisor receives a Tuesday morning request from the manager to access a replica of Monday's temporary virtual machine environment for the marketing team, recreates the virtual application server and the virtual disk, and stores the marketing data from Monday's snapshot of the marketing data into the recreated virtual disk. An engineer in the marketing application development team can experiment with new settings of the recreated virtual application server while still using Monday's marketing data, without having to wait for 8 hours for Monday's marketing data to be stored in the virtual disk.

Methods and systems are provided for data-persisting temporary virtual machine environments. First, a method for data-persisting temporary virtual machine environments will be described with reference to example embodiments. Then a system for data-persisting temporary virtual machine environments will be described.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

Figure 1:
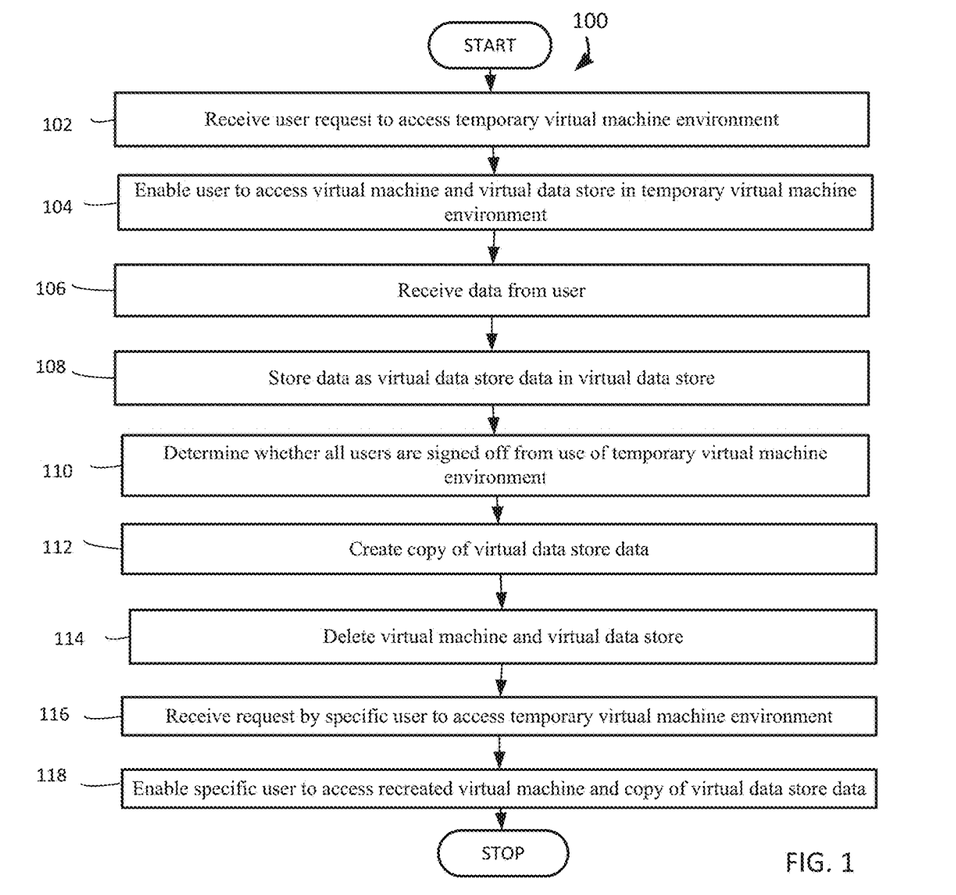
FIG. 1 depicts an operational flow diagram illustrating a high level overview of a method for data-persisting temporary virtual machine environments, in an embodiment.

FIG. 1 depicts an operational flow diagram illustrating a high level overview of a method 100 for data-persisting temporary virtual machine environments. The method 100 may be implemented on either a centralized computing platform or in parallel on a distributed computing platform.

A computing system receives a user request to access a temporary virtual machine environment, box 102. The computing system receives user requests to access temporary virtual machine environments that persist data. For example and without limitation, this can include the computing system's hypervisor receiving a Monday morning request from the manager of a marketing application development team to access a temporary virtual machine environment that persists data, which may be referred to as a "gold" temporary virtual machine environment. A user request can be a person who operates a computer asking the computer for something.

When a system user makes an Application Programming Interface (API) call to request access to a temporary virtual machine environment that persists data, the computing system can insert user data into a relational database table for tracking users currently using temporary virtual machine environments. The user data may include the user's username, an identifier of the temporary virtual machine environment, and a Boolean signifying that the user is currently enabled to add data to the temporary virtual machine environment. If the user subsequently signs off from using the temporary virtual machine environment, the computing system can use the user's username and the identifier of the temporary virtual machine environment (the username and this identifier may be a composite primary key) to access the relational database table for tracking users, and modify the Boolean for the user to signify that the user is done with using the temporary virtual machine environment.

After receiving a user's request to access a temporary virtual machine environment, the computing system enables the user to access a virtual machine and a virtual data store in the temporary virtual machine environment, box 104. The computing system enables users to access temporary virtual machine environments that persist data. By way of example and without limitation, this can include the hypervisor creating a virtual application server and a virtual disk for the temporary virtual machine environment requested by the manager, because this temporary virtual machine environment has not already been created for the team of users that includes the manager. Enabling a user to access a virtual machine and a virtual data store in a temporary virtual machine environment can include determining whether the temporary virtual machine environment is already created for a set of users that includes the user. If the temporary virtual machine environment is already created for the set of users that includes the user, the computing system directs the user to access the virtual machine and the virtual data store in the temporary virtual machine environment. For example, the hypervisor provides the manager with access information that directs the manager to access the virtual application server and the virtual disk in the temporary virtual machine environment requested by the manager because this temporary virtual machine environment has already been created for another member of the team of users that includes the manager.

Since the computing system can create many temporary virtual machine environments for many users, the computing system directs the users that are members of the same team to use the same temporary virtual machine environment if any of the team members indicate that they want their data to persist. The computing system enables each team of users to use only one temporary virtual machine environment that persists data, which prevents any team member's data from being overwritten because all team members store their data in the same set of virtual data stores, which the computing system uses to save the data together. Enabling a team of users to share the same temporary virtual machine environment that persists data is a safer approach than merging multiple data sets that were stored by multiple temporary virtual machine environments due to any potentially unexpected dependencies across the different data sets being saved, which can lead to data corruption.

If a member of a team requests to access a particular database of a specific size so that the team member can add data, the computing system directs the team member to access the one and only version of the team's temporary virtual machine environment, which may have multiple other databases to which the team member may not add any data. For example, if a team's temporary virtual machine environment includes a relational database, 3 specific file system stores, and 3 virtual machines dedicated to Apache Solr, the computing system directs a team member to access the team's temporary virtual machine environment to add data to the relational database. When the team member adds the data to the relational database, the temporary virtual machine environment's virtual machines add corresponding new files to their file system stores, and re-index the file system stores so that a search would locate the newly added data.

The computing system can add information to a relational database table for tracking temporary virtual machine environments. Below is an example of a table that the computing system can use to track temporary virtual machine environments.

| Lock identifier | Expiration date & time |
| --- | --- |
| gold-204-a03 | 2016 Nov. 17 23:41:44 |
| gold-206-a05 | 2016 Nov. 18 15:32:45 |
| gold-202-a08 | 2016 Nov. 17 14:72:38 |

The lock identifiers are unique for each of the temporary virtual machine environments. The computing system can use such a table to determine whether a temporary virtual machine environment has already been created for any member of a team. For example, if the computing system attempts to write the identifier for a temporary virtual machine environment to the relational database table and fails, this failure indicates that the identifier for the temporary virtual machine environment already exists in the table, which means that the temporary virtual machine environment already exists. Therefore, the computing system would provide the access information for the already created temporary virtual machine environment to the access requesting user. This process can prevent the computing system from creating another temporary virtual machine environment that persists data for any member of the same team. The computing system can use the expiration deadline to determine when to save the data for a temporary virtual machine environment's virtual data store, as described below.

Following the creation of virtual machine and a virtual data store in a temporary virtual machine environment, the computing system receives data from a user, box 106. The computing system receives user data that will be persisted for the temporary virtual machine environment. In embodiments, this can include the computing system receiving marketing data from the manager of the marketing application development team over an 8 hour period on Monday. Data can be the quantities, characters, or symbols on which operations are performed by a computer, being stored and transmitted in the form of electrical signals, and recorded on magnetic, optical, or mechanical recording media. A user can be a person who operates a computer.

After receiving data from a user, the computing system stores the data as virtual data store data in the virtual data store, box 108. The computing system stores the data that will be persisted. For example and without limitation, this can include the computing system storing the marketing data received from the manager of the marketing application development team into the virtual disk on Monday.

Subsequently, the computing system determines whether all users are signed off from use of the temporary virtual machine environment, box 110. The computing system determines when to copy data that will be persisted. By way of example and without limitation, this can include the computing system determining, on Monday night at the midnight expiration deadline for the marketing team's temporary virtual machine environment, whether all members of the marketing team have signed off from use of the virtual application server that is testing a marketing application with the marketing data stored in the virtual disk. The computing system's determination that all users are signed off from use of the temporary virtual machine environment occurs in response to an expiration of a deadline for the temporary virtual machine environment, such as the example of the deadline's expiration at midnight on Monday initiating the determination of whether all the users have signed off from use of the temporary virtual machine environment. Although this example illustrates an expiration deadline that is based on several hours after the creation of the temporary virtual machine environment, the expiration deadline may be based on any date and time duration, such as one hour after the creation of the temporary virtual machine environment or many days after the creation of the temporary virtual machine environment. A system administrator may set the expiration deadline. When a user signs off from using the temporary virtual machine environment, the computing system can use the user's username and the identifier of the temporary virtual machine environment (the username and this identifier may be a composite primary key) to access the relational database table for tracking users, and modify the Boolean for the user to signify that the user is done with using the temporary virtual machine environment. A sign off can be a termination of computer usage.

If all members of a team have signed off from using a temporary virtual machine environment, the computing system updates itself so that it can provide the most recent version of database schemas, and updates other internal maintenance requirements, which enables the computing system to provide a current version of the temporary virtual machine environment to requesting users. Since the computing system applies a schema update to the data stored in a virtual data store before the computing system creates a copy of the data, the copied data is schema-updated data. The computing system updates itself by validating any executing services using the team's data, and shutting down these services in preparation for saving the team's data. Validating any existing services using the team's data may include the computing system creating a new virtual machine that can access the team's data, configuring a new database for the team's data, storing the team's data in the new database, and applying any new schema updates to the new database that stores the team's data. Examples of a schema update include executing SQL commands such as "create table TABLE," "drop TABLE," and "add column." An error may occur during the validation process, such as if the computing system is unable to create a new virtual machine to access the team's data or if the computing system is unable to configure a new database for the team's data and store the team's data in the new database. A schema update can be a current representation in the form of a model.

If all members of a team have not signed off from using a temporary virtual machine environment yet, the computing system may alert the members who have not signed off yet that their temporary virtual machine environment will be deleted after a specified time, wait the specified time, and then delete their temporary virtual machine environment. Alternatively, if all members of a team have not signed off yet, the computing system may still delete their temporary virtual machine environment.

If all users are signed off from use of the temporary virtual machine environment, the computing system creates a copy of the virtual data store data, box 112. The computing system persists the data in the temporary virtual machine environment. In embodiments, this can include the computing system creating a Monday night snapshot of the marketing data in the virtual disk because all of the members of the marketing application development team have signed off from use of the temporary virtual machine environment that is testing the marketing application, and creating an identifier that uniquely identifies the Monday night snapshot.

If the data sets in the virtual data stores are independent from each other, then persisting the data may be relatively simple. However, some of the data stored in the virtual data stores may have dependent relationships with other data stored in the virtual data stores, such as when indexes in an enterprise search platform rely on the metadata in a relational database for searches to function properly. Therefore, the computing system can use some logic and unique tagging to track which data must be saved together, and tag the data in such a way that identifies which saved data depends on other saved data, which enables such data to be properly restored together. When creating a copy of virtual data store data, the computing system identifies any another data store that stores any other data that has a dependency relationship with the data in the copy of the virtual data store data, creates a copy of the other data in the other data store, and then tags the copy of the virtual data store data and/or the copy of the other data with information that identifies the dependency relationship. A copy can be a thing made to be similar or identical to another thing. A tag can be a label attached to someone or something for the purpose of identification or to give other information. A dependency relationship can be the way in which two or more objects are controlled, determined by, or rely on each other.

For example, a temporary virtual machine environment may store Apache Solr index data, which is dependent on the data stored in a relational database and its metadata. If the metadata of the relational database and the Apache solr index data are not synchronized (such as if the virtual data store containing the Apache solr indexes points to a different relational database), then a search for data in the relational database would result in errors. In this example, 3 virtual machines are dedicated to Apache solr, and each of the virtual machines has a virtual drive mounted to data that consists of the Apache solr index data. In order to properly persist this data for future use, the computing system creates snapshots of all 3 virtual machines' Apache solr index data, as well as a snapshot of the relational database. Then the computing system tags the snapshots to indicate the dependencies that the Apache solr indexes have on the relational database. The tags of the snapshots can consist of a product, a persisted data iteration, a database name, the virtual machine number from which the data was saved (which enables the computing system to know to which virtual machine to mount a virtual data store for the future temporary virtual machine environments) and the number of virtual machines for this tier that must be present (in this case, 3). In this example, since the computing system saves indexes for 3 Apache solr tiers, then the computing system can tag each of these snapshots with something like: <product>|<persisted data iteration>|<database name>|<machine number the data was saved from>|<number of tiers are needed>|<mount of the folder from which the data was saved>. For this example, the tags would be solr||10|a07|1|3|ondisk, solr||10|a07|2|3|ondisk, and solr|10|a07|3|3|ondisk.

In order for the indexes to function properly, the computing system can copy the data the indexes were meant for. In this example, since this data is stored in the relational database that is stored by a separate virtual disk accessed by a separate virtual machine, the computing system also creates a snapshot of the data in the relational database. If the data in the relational database is not copied or if the Apache solr indexes are used with a different database, the search function that uses the Apache solr indexes would produce errors. The computing system can also tag the snapshot of the data in the relational database to indicate the relationship between the data in the relational database and the Apache solr indexes. In this example, the key information is the persisted data iteration and the database name, such as db|10|a07. This persisted data iteration indicates that the Apache solr data was saved with the 10th iteration of the persisted data of the database that is named "a07." Furthermore, the future temporary virtual machine environment requested from users who access the new Apache solr index data results in a temporary virtual machine environment that is pre-set to contain 3 Apache solr virtual machines, so that all of the data would be synchronized with each other. Therefore, the computing system snapshots and tags all the data sets in the virtual data stores to indicate that they are saved together due to potential dependencies between the data stores' metadata, which ensures that all the data from the data stores in the future temporary virtual machine environment will work after the future temporary virtual machine environment is created and configured.

After creating a snapshot of a team's data, the computing system determines whether the snapshot has been successfully saved to persistent storage. If the snapshot has been successfully saved to persistent storage, the computing system notifies the system users who were using the snapshot's data that their data was successfully saved. If the snapshot has not been successfully saved to persistent storage, the computing system continues attempting to save the snapshot to persistent storage. If the snapshot has still not been successfully saved to persistent storage after a certain number of attempts, then the computing system notifies the system users who were using the snapshot's data that their data was not successfully saved, and deletes any part of the snapshot that was successfully saved to persistent storage.

After copying the data in a virtual data store accessed by a virtual machine, the computing system deletes the virtual machine and the virtual data store, box 114. The computing system occasionally deletes a temporary virtual machine environment. For example and without limitation, this can include the computing system deleting the virtual application server that was testing the marketing application and deleting the virtual disk that stored the marketing data because the computing system has already created the Monday night snapshot of the marketing data stored in the virtual disk. The computing system restricts a user from deleting a temporary virtual machine environment because another member of the user's team may be using the temporary virtual machine environment.

Once the computing system has successfully updated and stored the copies of the team's data in persistent storage, the computing system may identify the system users who had not signed off and were alerted that their temporary virtual machine environment would be deleted after a specified time, and notify these system users that their temporary virtual machine environment is available for use again. Alternatively, the computing system can notify all users who used the temporary virtual machine environment about the new availability of their temporary virtual machine environment.

Following the deletion of a temporary virtual machine environment's virtual machine(s) and virtual data store(s), the computing system receives a request by a specific user to access the temporary virtual machine environment, box 116. The computing system receives requests over tine to access the same temporary virtual machine environment. By way of example and without limitation, this can include the hypervisor receiving a Tuesday morning request from the manager to recreate the temporary virtual machine environment for the marketing team.

After receiving a request by a specific user to access a temporary virtual machine environment, the computing system enables the specific user to access a recreated virtual machine and the copy of the virtual data store data, box 118. The computing system provides a temporary virtual machine environment that persists data. In embodiments, this can include the hypervisor recreating the virtual application server and the virtual disk for the temporary virtual machine environment requested by the manager on Tuesday morning and storing the marketing data from Monday's snapshot of the marketing data on the virtual disk because this temporary virtual machine environment has not already been recreated for the team of users that includes the manager. Enabling a specific user to access the recreated virtual machine and the copy of the virtual data store data can include determining whether the temporary virtual machine environment that includes the recreated virtual machine and a recreated virtual data store has been created for a set of users that includes the specific user. If the temporary virtual machine environment is already created for the set of users that includes the specific user, the computing system directs the specific user to access the recreated virtual machine and the recreated virtual data store in the already created temporary virtual machine environment. For example, the hypervisor provides the manager with access information that directs the manager to access the virtual application server and the virtual disk for the temporary virtual machine environment requested by the manager because this temporary virtual machine environment has already been created for another member of the team of users that includes the manager.

After requesting the creation of a temporary virtual machine environment, a user has the option to select from different copies of data that the computing system has stored in persistent storage. For example, the manager has the option to select Monday's snapshot of marketing data, Friday's snapshot of marketing data, or Monday's snapshot of sales data, and selects Monday's snapshot of marketing data. When enabling a user to access a recreated virtual machine and a copy of the virtual data store data that was stored in a previous virtual data store, the computing system can identify any other data that has a dependency relationship with the data in the copy of the virtual data store data, and enable the user to access the other data stored in another virtual data store via another virtual machine. The computing system can use the tags for the copies of the data to select the appropriate copies of the data that need to be restored together. For example, after the hypervisor creates a temporary virtual machine environment that is pre-set to contain 3 Apache solr virtual machines, and the user selects to restore the data set for one of the Apache solr indexes, the computing system identifies all of the data sets previously stored in the Apache solr indexes and the corresponding relational database through tags specifying the dependency relationships, and restores all of the data sets to corresponding virtual data stores, such that the data sets are synchronized with each other. The computing system can evaluate whether the user-selected data matches the configuration of the user-selected temporary virtual machine environment, and notify the requesting user if the requested temporary virtual machine environment needs to be reconfigured to match the user-selected data.

In these examples, any of the members of the marketing application development team can access the persisted marketing data stored in the recreated virtual disk via the recreated virtual application server that tests the marketing application. An engineer in the marketing application development team can experiment with new settings of the recreated virtual application server on Tuesday while still using Monday's marketing data, without having to wait for 8 hours for Monday's marketing data to be stored on the virtual disk.

Figure 2:
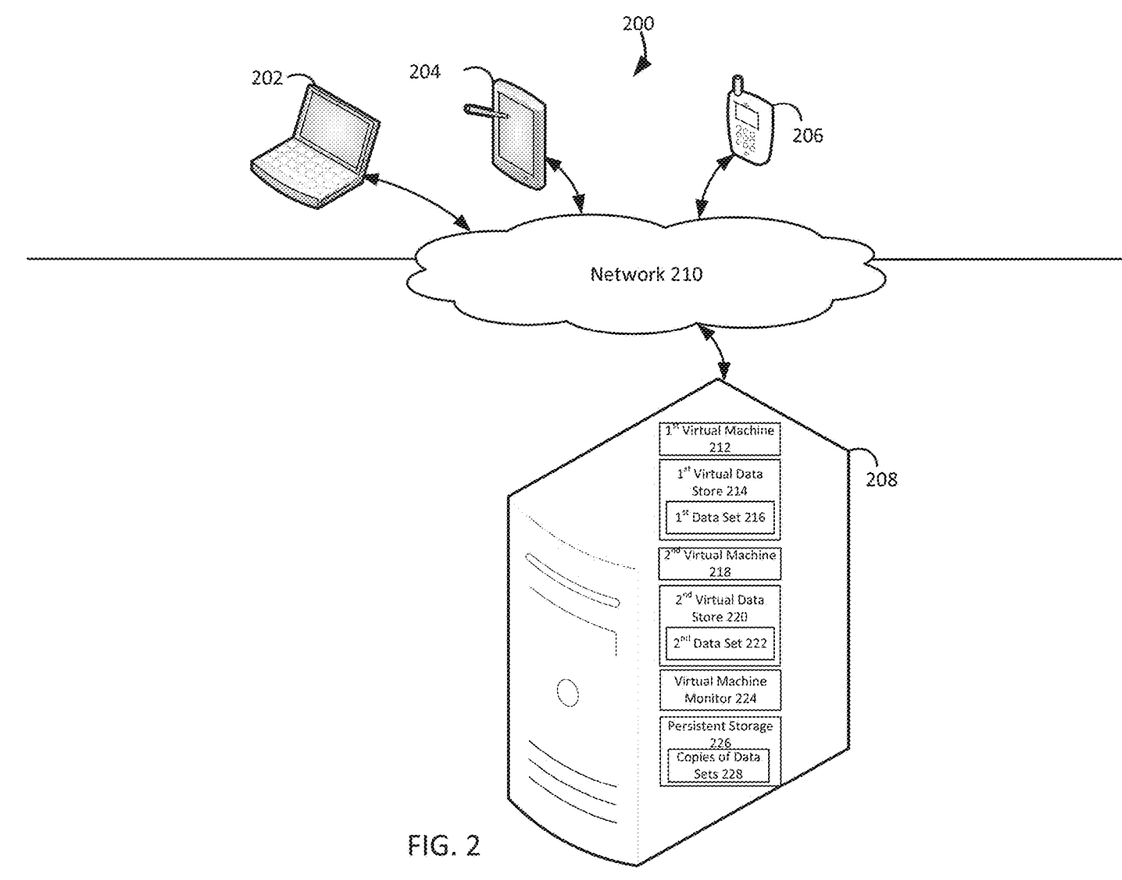
FIG. 2 depicts an example system for data-persisting temporary virtual machine environments, in an embodiment.

FIG. 2 illustrates a block diagram of a system that implements data-persisting temporary virtual machine environments, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a first client 202, a second client 204, and a third client 206; and a server 208 that may be provided by a hosting company. The first client 202 may be a laptop computer, the second client 204 may be a tablet computer, the third client 206 may be a mobile telephone such as a smart phone, and the server 208 may be a computer capable of hosting multiple virtual machines. The clients 202-206 and the server 208 communicate via a network 210. The server 208 includes a first virtual machine 212 that uses a first virtual data store 214 to store a first data set 216, a second virtual machine 218 that use a second virtual data store 220 to store a second data set 222, and a virtual machine monitor 224 that uses persistent storage 226 to store copies of data sets 228. The first virtual machine 212 may be referred to as the virtual application server 212, the first virtual data store 214 may be referred to as the virtual disk 214, the first data set 216 may be referred to as the marketing data 216, and the virtual machine monitor 224 may be referred to as the hypervisor 224. Although FIG. 2 depicts the system 200 with three clients 202-206, one server 208, one network 210, two virtual machines 212 and 218, two virtual data stores 214 and 220, two data sets 216 and 222, one virtual machine monitor 224, one persistent storage 226, and one copies of data sets 228, the system 200 may include any number of clients 202-206, any number of server 208, any number of network 210, any number of virtual machines 212 and 218, any number of virtual data stores 214 and 220, any number of data sets 216 and 222, any number of virtual machine monitor 224, any number of persistent storage 226, and any number of copies of data sets 228. The clients 202-206 and the server 208 may each be substantially similar to the system 300 depicted in FIG. 3 and described below. FIG. 2 depicts the persistent storage 226 and the copies of data sets 228 residing completely on the server 208, but the persistent storage 226 and the copies of data sets 228 may reside completely on any of the clients 202-206, completely on another server that is not depicted in FIG. 2, or in any combination of partially on the server 208, partially on the clients 202-206, and partially on the other server that is not depicted.

For example, the hypervisor 224 receives a Monday morning request from the laptop computer 202 of the manager of a marketing application development team to access a temporary virtual machine environment, and creates the virtual application server 212 and the virtual disk 214. The system 200 receives the marketing data 216 from the laptop computer 202 of the manager over an 8 hour period on Monday, and stores the marketing data 216 into the virtual disk 214 on Monday. The system 200 creates a Monday night snapshot of the marketing data 216 in the virtual disk 214 because the clients 202-206 for all of the members of the marketing application development team have signed off from use of the temporary virtual machine environment that is testing the marketing application, and creates an identifier that uniquely identifies the Monday night snapshot. The hypervisor 224 deletes the virtual application server 212 that was testing the marketing application and deletes the virtual disk 214. The hypervisor 224 receives a Tuesday morning request from the laptop computer 202 of the manager to access the temporary virtual machine environment for the marketing team, recreates the virtual application server 212 and the virtual disk 214, and stores the marketing data 216 from Monday's snapshot of the marketing data 216 into the recreated virtual disk 214. An engineer in the marketing application development team can experiment with new settings of the recreated virtual application server 212 on Tuesday while still using Monday's marketing data 216, without having to wait for 8 hours for Monday's marketing data 216 to be stored in the recreated virtual disk 214.

System Overview

Figure 3:
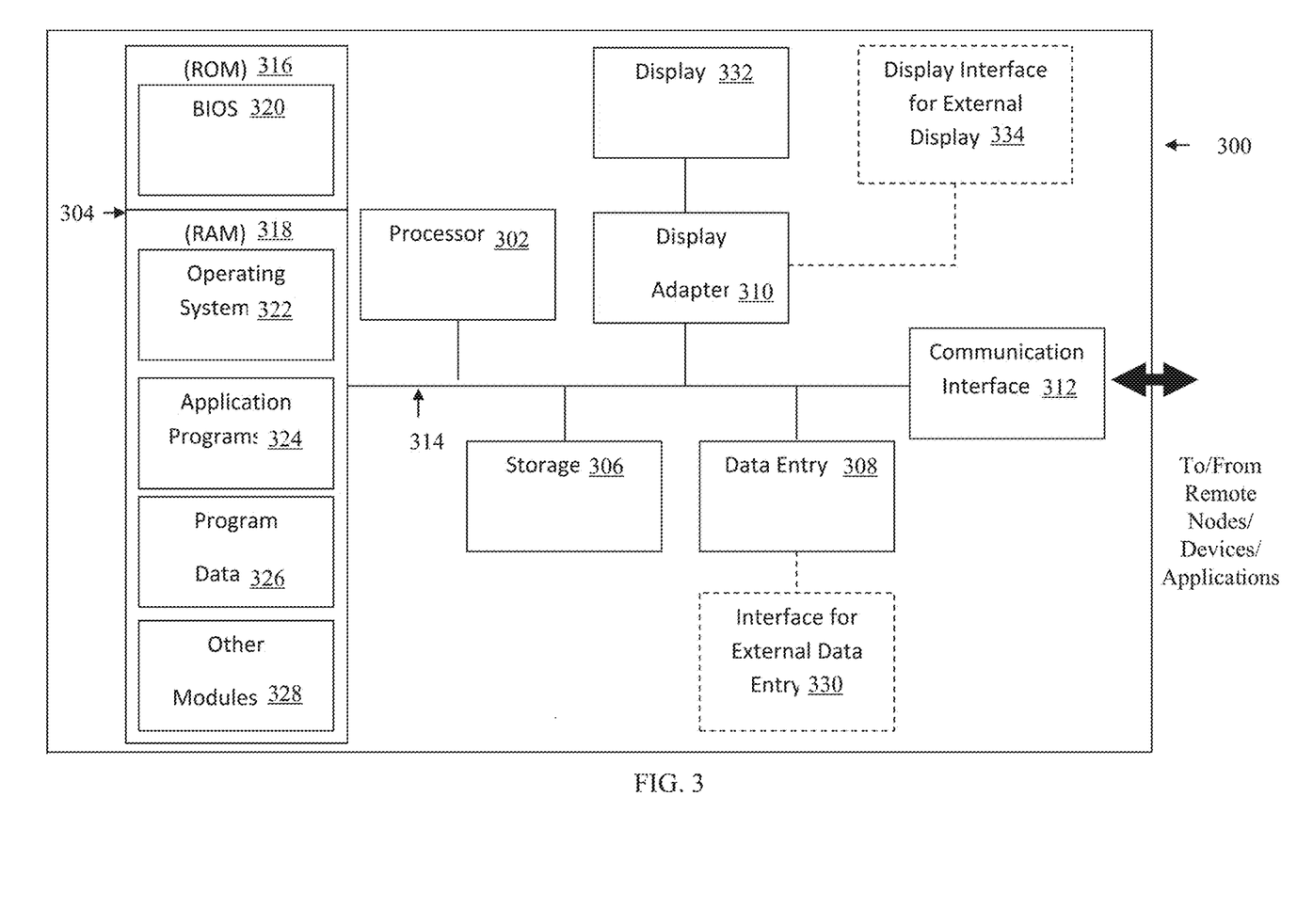
FIG. 3 is a block diagram illustrating an example hardware device in which the subject matter may be implemented.

Having describing the subject matter in detail, an exemplary hardware device in which the subject matter may be implemented shall be described. Those of ordinary skill in the art will appreciate that the elements illustrated in FIG. 3 may vary depending on the system implementation. With reference to FIG. 3, an exemplary system for implementing the subject matter disclosed herein includes a hardware device 300, including a processing unit 302, memory 304, storage 306, a data entry module 308, a display adapter 310, a communication interface 312, and a bus 314 that couples the elements 304-312 to the processing unit 302.

The bus 314 may comprise any type of bus architecture. Examples include a memory bus, a peripheral bus, a local bus, etc. The processing unit 302 is an instruction execution machine, apparatus, or device and may comprise a microprocessor, a digital signal processor, a graphics processing unit, an application specific integrated circuit (ASIC), a field programmable gate array (FPGA), etc. The processing unit 302 may be configured to execute program instructions stored in the memory 304 and/or the storage 306 and/or received via the data entry module 308.

The memory 304 may include read only memory (ROM) 316 and random access memory (RAM) 318. The memory 304 may be configured to store program instructions and data during operation of the hardware device 300. In various embodiments, the memory 304 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 304 may also include nonvolatile memory technologies such as nonvolatile flash RAM (NVRAM) or ROM. In some embodiments, it is contemplated that the memory 304 may include a combination of technologies such as the foregoing, as well as other technologies not specifically mentioned. When the subject matter is implemented in a computer system, a basic input/output system (BIOS) 320, containing the basic routines that help to transfer information between elements within the computer system, such as during start-up, is stored in the ROM 316.

The storage 306 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 300.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 306, the ROM 316 or the RAM 318, including an operating system 322, one or more applications programs 324, program data 326, and other program modules 328. A user may enter commands and information into the hardware device 300 through the data entry module 308. The data entry module 308 may include mechanisms such as a keyboard, a touch screen, a pointing device, etc. Other external input devices (not shown) are connected to the hardware device 300 via an external data entry interface 330. By way of example and not limitation, external input devices may include a microphone, joystick, game pad, satellite dish, scanner, or the like. In some embodiments, external input devices may include video or audio input devices such as a video camera, a still camera, etc. The data entry module 308 may be configured to receive input from one or more users of the hardware device 300 and to deliver such input to the processing unit 302 and/or the memory 304 via the bus 314.

A display 332 is also connected to the bus 314 via the display adapter 310. The display 332 may be configured to display output of the hardware device 300 to one or more users. In some embodiments, a given device such as a touch screen, for example, may function as both the data entry module 308 and the display 332. External display devices may also be connected to the bus 314 via an external display interface 334. Other peripheral output devices, not shown, such as speakers and printers, may be connected to the hardware device 300.

The hardware device 300 may operate in a networked environment using logical connections to one or more remote nodes (not shown) via the communication interface 312. The remote node may be another computer, a server, a router, a peer device or other common network node, and typically includes many or all of the elements described above relative to the hardware device 300. The communication interface 312 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 312 may include logic configured to support direct memory access (DMA) transfers between the memory 304 and other devices.

In a networked environment, program modules depicted relative to the hardware device 300, or portions thereof, may be stored in a remote storage device, such as, for example, on a server. It will be appreciated that other hardware and/or software to establish a communications link between the hardware device 300 and other devices may be used.

It should be understood that the arrangement of the hardware device 300 illustrated in FIG. 3 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 300.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 3.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for data-persisting temporary virtual machine environments, the system comprising:
one or more processors; and
a non-transitory computer readable medium storing a plurality of instructions, which when executed, cause the one or more processors to:
enable a user to access a virtual machine and a virtual data store in a temporary virtual machine environment in response to receiving a user request to access the temporary virtual machine environment;
store data as virtual data store data in the virtual data store in response to receiving the data from the user;
create a copy of the virtual data store data in response to a determination that all users are signed off from use of the temporary virtual machine environment, the determination being made in response to an expiration of a deadline for the temporary virtual machine environment;
delete the virtual machine and the virtual data store;
receive a request by a specific user to access the temporary virtual machine environment; and
enable the specific user to access a recreated virtual machine and the copy of the virtual data store data.

2. The system of claim 1, wherein the plurality of instructions to enable the user to access the virtual machine and the virtual data store in the temporary virtual machine environment further cause the one or more processors to:
determine whether the temporary virtual machine environment is already created for a set of users that comprises the user;
create the virtual machine and the virtual data store in the temporary virtual machine environment in response to a determination that the temporary virtual machine is not already created for the set of users that comprises the user; and
direct the user to access the virtual machine and the virtual data store in the temporary virtual machine environment in response to a determination that the temporary virtual machine is already created for the set of users that comprises the user.

3. The system of claim 1, wherein the plurality of instructions to create the copy of the virtual data store data further cause the one or more processors to apply a schema update to the data prior to creating the copy of the data.

4. The system of claim 1, wherein the plurality of instructions to create the copy of the virtual data store data further cause the one or more processors to:
identify another data store that stores other data that has a dependency relationship with the data in the virtual data store data;
create a copy of the other data in the other data store; and
tag at least one of the copy of the virtual data store data and the copy of the other data with information that identifies the dependency relationship.

5. The system of claim 1, wherein the plurality of instructions to enable the specific user to access the recreated virtual machine and the copy of the virtual data store data further cause the one or more processors to:
identify other data that has a dependency relationship with the copy of the virtual data store data; and
enable the specific user to access the other data stored in another virtual data store via another virtual machine.

6. The system of claim 1, wherein the plurality of instructions to enable the specific user to access the recreated virtual machine and the copy of the virtual data store data further cause the one or more processors to:
determine whether the temporary virtual machine environment that includes the recreated virtual machine and a recreated virtual data store has been created for a set of users that includes the specific user;

create the temporary virtual machine environment that includes the recreated virtual machine and the recreated virtual data store in response to a determination that the temporary virtual machine is not already created for the set of users that include the specific user; and direct the user to access the recreated virtual machine and the recreated virtual data store in the temporary virtual machine environment in response to a determination that the temporary virtual machine is already created for the set of users that includes the specific user.

7. A computer program product comprising computer-readable program code to be executed by one or more processors when retrieved from a non-transitory computer-readable medium, the program code including instructions to:

enable a user to access a virtual machine and a virtual data store in a temporary virtual machine environment in response to receiving a user request to access the temporary virtual machine environment;

store data as virtual data store data in the virtual data store in response to receiving the data from the user;

create a copy of the virtual data store data in response to a determination that all users are signed off from use of the temporary virtual machine environment, the determination being made in response to an expiration of a deadline for the temporary virtual machine environment;

delete the virtual machine and the virtual data store;

receive a request by a specific user to access the temporary virtual machine environment; and enable the specific user to access a recreated virtual machine and the copy of the virtual data store data.

8. The computer program product of claim 7, wherein the instructions to enable the user to access the virtual machine and the virtual data store in the temporary virtual machine environment comprise further instructions to:

determine whether the temporary virtual machine environment is already created for a set of users that comprises the user;

create the virtual machine and the virtual data store in the temporary virtual machine environment in response to a determination that the temporary virtual machine is not already created for the set of users that comprises the user; and direct the user to access the virtual machine and the virtual data store in the temporary virtual machine environment in response to a determination that the temporary virtual machine is already created for the set of users that comprises the user.

9. The computer program product of claim 7, wherein the instructions to create the copy of the data in the virtual data store comprise further instructions to apply a schema update to the data prior to creating the copy of the data.

10. The computer program product of claim 7, wherein the instructions to create the copy of the virtual data store data comprise further instructions to:

identify another data store that stores other data that has a dependency relationship with the data in the copy of the virtual data store data;

create a copy of the other data in the other data store; and tag at least one of the copy of the virtual data store data and the copy of the other data with information that identifies the dependency relationship.

11. The computer program product of claim 7, wherein the instructions to enable the specific user to access the recreated virtual machine and the copy of the virtual data store data further comprise instructions to:

identify other data that has a dependency relationship with the data in the copy of the virtual data store data; and enable the specific user to access the other data stored in another virtual data store via another virtual machine.

12. The computer program product of claim 7, wherein the instructions to enable the specific user to access the recreated virtual machine and the copy of the virtual data store data comprise further instructions to:

determine whether the temporary virtual machine environment that includes the recreated virtual machine and a recreated virtual data store has been created for a set of users that includes the specific user;

create the temporary virtual machine environment that includes the recreated virtual machine and the recreated virtual data store in response to a determination that the temporary virtual machine is not already created for the set of users that include the specific user; and direct the user to access the recreated virtual machine and the recreated virtual data store in the temporary virtual machine environment in response to a determination that the temporary virtual machine is already created for the set of users that includes the specific user.

13. A method comprising:

enabling, by a computing system, a user to access a virtual machine and a virtual data store in a temporary virtual machine environment in response to receiving a user request to access the temporary virtual machine environment;

storing, by the computing system, data as virtual data store data in the virtual data store in response to receiving the data from the user;

creating, by the computing system, a copy of the virtual data store data in response to a determination that all users are signed off from use of the temporary virtual machine environment, the determination being made in response to an expiration of a deadline for the temporary virtual machine environment;

deleting, by the computing system, the virtual machine and the virtual data store;

receiving, by the computing system, a request by a specific user to access the temporary virtual machine environment; and enabling, by the computing system, the specific user to access a recreated virtual machine and the copy of the virtual data store data.

14. The method of claim 13, wherein enabling the user to access the virtual machine and the virtual data store in the temporary virtual machine environment comprises:

determining, by the computing system, whether the temporary virtual machine environment is already created for a set of users that comprises the user;

creating, by the computing system, the virtual machine and the virtual data store in the temporary virtual machine environment in response to a determination that the temporary virtual machine is not already created for the set of users that comprises the user; and directing, by the computing system, the user to access the virtual machine and the virtual data store in the temporary virtual machine environment in response to a determination that the temporary virtual machine is already created for the set of users that comprises the user.

15. The method of claim 13, wherein creating the copy of the data as the virtual data store data in the virtual data store comprises:

applying, by the computing system, a schema update to the data prior to creating the copy of the virtual data store data;

identifying, by the computing system, another data store that stores other data that has a dependency relationship with the data in the copy of the virtual data store data;

creating, by the computing system, a copy of the other data in the other data store; and tagging, by the computing system, at least one of the copy of the virtual data store data and the copy of the other data with information that identifies the dependency relationship.

16. The method of claim 13, wherein enabling the specific user to access the recreated virtual machine and the copy of the virtual data store data comprises:

identifying, by the computing system, other data that has a dependency relationship with the data in the copy of the virtual data store data; and enabling, by the computing system, the specific user to access the other data stored in another virtual data store via another virtual machine.

17. The method of claim 13, wherein enabling the specific user to access the recreated virtual machine and the copy of the virtual data store data comprises:

determining, by the computing system, whether the temporary virtual machine environment that includes the recreated virtual machine and a recreated virtual data store has been created for a set of users that includes the specific user;

creating, by the computing system, the temporary virtual machine environment that includes the recreated virtual machine and the recreated virtual data store in response to a determination that the temporary virtual machine is not already created for the set of users that include the specific user; and directing, by the computing system, the user to access the recreated virtual machine and the recreated virtual data store in the temporary virtual machine environment in response to a determination that the temporary virtual machine is already created for the set of users that includes the specific user.

* * * * *